United States Patent
Fisch et al.

(10) Patent No.: US 6,976,437 B2
(45) Date of Patent: Dec. 20, 2005

(54) BLOW MOLDED PALLET WITH INSERTS

(75) Inventors: Robert J. Fisch, Elkhorn, WI (US);
Randal P. Wiser, Delevan, WI (US);
Amy R. Seibel, Mequon, WI (US);
Floyd F. Markling, Wiersdale, FL (US)

(73) Assignee: Poly-Flex, Inc., Walworth, WI (US)

( * ) Notice: Subject to any disclaimer, the term of this patent is extended or adjusted under 35 U.S.C. 154(b) by 0 days.

(21) Appl. No.: 10/368,284

(22) Filed: Feb. 17, 2003

(65) Prior Publication Data

US 2004/0159266 A1 Aug. 19, 2004

(51) Int. Cl.$^7$ .............................................. B65D 19/38
(52) U.S. Cl. ............................................... 108/57.25
(58) Field of Search ....................... 108/57.25, 57.26, 108/57.27, 57.28, 51.11, 56.1

(56) References Cited

U.S. PATENT DOCUMENTS

| | | | | |
|---|---|---|---|---|
| 4,013,021 A | * | 3/1977 | Steinlein et al. | 108/57.25 |
| 5,117,762 A | * | 6/1992 | Shuert | 108/57.25 |
| 5,316,377 A | | 5/1994 | Markling et al. | |
| 5,337,681 A | * | 8/1994 | Schrage | 108/56.1 |
| 5,413,052 A | | 5/1995 | Breezer et al. | |
| 5,417,167 A | | 5/1995 | Sadr | |
| 5,564,344 A | | 10/1996 | Downes, Jr. et al. | |
| 5,778,801 A | * | 7/1998 | Delacour | 108/57.25 |
| 5,845,588 A | * | 12/1998 | Gronnevik | 108/57.27 |
| 5,868,080 A | | 2/1999 | Wyler et al. | |
| 5,894,803 A | * | 4/1999 | Kuga | 108/51.11 |
| 5,922,269 A | | 7/1999 | Gronnevik et al. | |
| 5,950,546 A | | 9/1999 | Brown et al. | |
| 6,006,677 A | * | 12/1999 | Apps et al. | 108/57.25 |
| 6,029,582 A | | 2/2000 | Ogilvie, Jr. et al. | |
| 6,199,488 B1 | * | 3/2001 | Favaron et al. | 108/57.25 |
| 6,209,464 B1 | | 4/2001 | Elder | |
| 6,216,608 B1 | * | 4/2001 | Woods et al. | 108/57.25 |
| D443,969 S | | 6/2001 | Apps | |
| 6,250,234 B1 | | 6/2001 | Apps | |
| 6,283,044 B1 | | 9/2001 | Apps | |
| 6,289,823 B1 | | 9/2001 | Koefelda et al. | |
| 6,305,301 B1 | * | 10/2001 | Piper et al. | 108/57.25 |
| 6,357,366 B1 | * | 3/2002 | Frankenberg | 108/57.25 |
| 6,389,990 B1 | | 5/2002 | Apps | |
| 6,668,735 B2 | * | 12/2003 | Cassina | 108/57.25 |

OTHER PUBLICATIONS

SKIDMARX; Low Cost, Light Weight Recyclable Pallet Systems; http://www.skidmarx.com/skidmarx.htm.
BUCKHORN; The Best Usable Plastic Packaging Opportunities; 2002; pp. 5–16, Form No. 401144 1/02 40M.

* cited by examiner

*Primary Examiner*—Jose V. Chen
(74) *Attorney, Agent, or Firm*—D L Tschida

(57) ABSTRACT

A pallet system includes a pallet body. The pallet body is formed from a first, independently formed first portion and a second blow molded second upper portion insert molded to the first portion. The pallet body may have two to eight recesses for forklift truck fork access. The second upper portion has a generally rectangular surface for carrying loads. The portions may have anti-skid properties, for example, a knurled topside surface or rubber coated bottom. At least one foot is attached to the second upper portion by insert molding. At least one runner may be attached to each foot to form part of the first portion. At least one stringer is attached to each runner to add further stability to the pallet. The runners and feet have channels or protruding members to effectively mate with the second upper portion. The system may also have top cap and tie members to affix the cap to one or more pallet bodies.

38 Claims, 20 Drawing Sheets

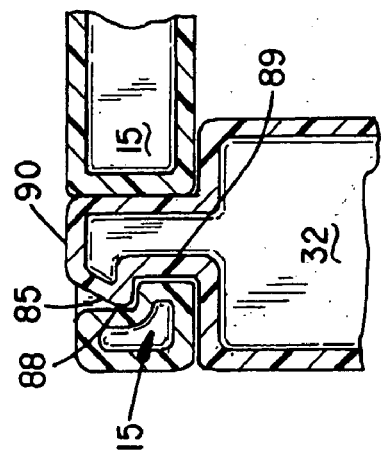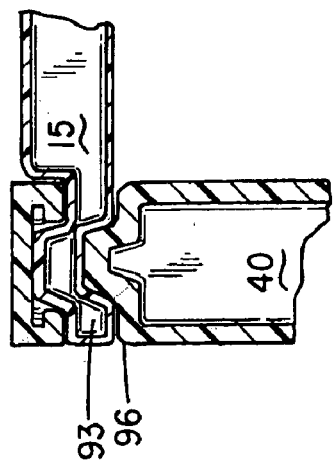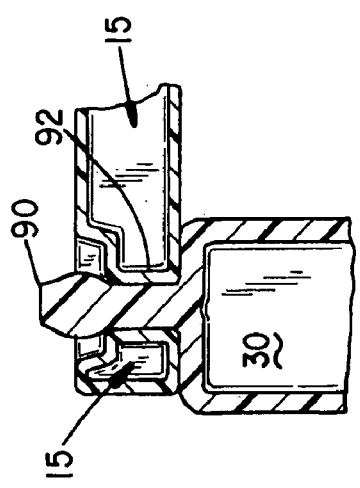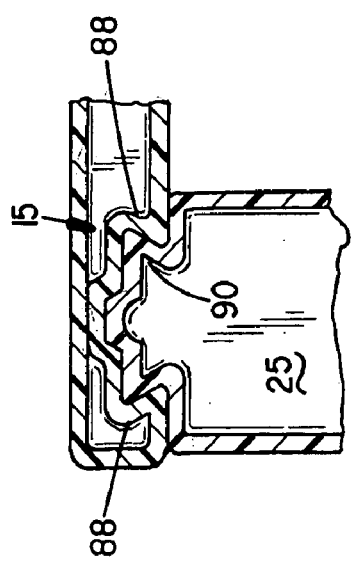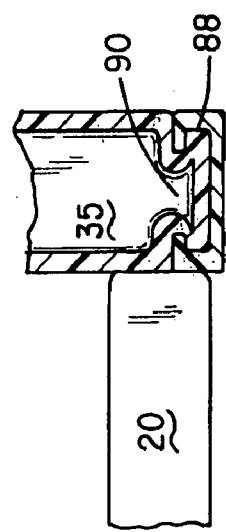

BLOW MOLDED PALLET WITH INSERTS

BACKGROUND OF THE INVENTION

1. Field of the Invention

The present invention relates in general to the field of plastics. More particularly, the present invention relates to a pallet system and a pallet apparatus and a method of pallet manufacturing. Specifically, one preferred embodiment of the present invention relates to blow molding a first pallet piece and then inserting it into another mold to join it to a second blow molded pallet piece.

2. Discussion of the Related Art

Pallets are used for transporting and storing various types of cargo throughout the world. Therefore, it is important for a pallet to be lightweight, compact and strong. Traditionally pallets were made of wood, however, plastic pallets are now being used with increased frequency as they are lightweight, generally stronger, do not absorb moisture, and they can be cleaned and disinfected which is important in particular for the food industry. One disadvantage of plastic pallets is that they tend to break up with continued use over time. Therefore, for these and other various reasons it is important that plastic pallets be reinforced by a variety of means.

The below-referenced U.S. patents disclose embodiments that were at least in-part satisfactory for the purposes for which they were intended. The disclosures of all the below-referenced prior United States patents, in their entireties, are hereby expressly incorporated by reference into the present application for purposes including, but not limited to, indicating the background of the present invention and illustrating the state of the art.

U.S. Pat. No. 5,417,167 discloses a plastic shipping pallet of the type usually manufactured from wood which is made of hollow plastic stringers and deck boards. The stringers and deck boards are made of plastic materials that may be either virgin plastic, recycled plastics or mixes. The stringers and deck boards are hollow but have closed ends to prevent entry of dirt, fluids, insects and vermin. The stringers and deck boards may be made in a blow molding process or using continuous extrusion and molding processes similar to that used in the manufacture of corrugated pipe. Various connection configurations for affixing the deck boards to the stringers are described including fixation by screws as well as interlocking connections between the plastic parts themselves and the use of separate interlocking components which engage the deck board and stringers.

U.S. Pat. No. 5,845,588 discloses a pallet fabricated of a thermoplastic material which is produced by joining together individually fabricated structural components, each of which is individually thermoformed from an extruded plastic parison of a multilayer structure. The structural components include a deck in the form of a continuous sheet with longitudinal and transverse sides, one or more upper runner components fastened by their top side to the bottom of the deck, each of which includes a cross member with downward-facing posts, and one or more lower runner components, each of which includes a cross member with upward-facing posts and which is fastened by the tops of its posts to the bottoms of matching posts on the corresponding upper runner components.

U.S. Pat. No. 5,868,080 discloses a reinforced plastic pallet construction and assembly method wherein multiple reinforcing bars are employed. At least some of the reinforcing bars have an exposed surface at a topside surface, underneath surface or underside surface of the pallet. In addition to functioning as a reinforcing member, the exposed surfaces of the reinforcing bars comprise an anti-skid surface for maintaining positioning of payload on the pallet or facilitating transport of the pallet, e.g., via a forklift or automated transport system. Various techniques for retaining the reinforcing bars within channels formed in the plastic pallet body are described. The reinforcing bars preferably comprise composite structural members of fiberglass reinforced plastic fabricated from a pultrusion process.

U.S. Pat. No. 6,209,464 discloses a pallet that includes a rectangular support deck having a substantially planar upper supporting surface including a plurality of channels formed therein and extending across the pallet. The deck includes support members extending from an underside of the deck that nest in recesses formed in the upper surface of the deck. An alignment portion is formed at a center point along the first edge of the deck and a second alignment portion is formed at a center point of an opposed edge of the deck. The alignment portion includes angled sides for receiving a tapered member of a complementary device.

SUMMARY AND OBJECTS OF THE INVENTION

It is one object of the present invention to provide a light-weight and compact yet more durable pallet. It is another object of the invention to use 100% recycled plastic in construction of the pallet to provide a cleaner environment. It is still another object of the invention to have a pallet with improved weight to strength ratio. It is yet another object to provide a pallet that is stackable and nestable with other pallets. It another object of the invention to provide a pallet of varying colors that is inexpensive to produce and easy to manufacture using largely recycled materials.

Another object of the invention is to provide a pallet that is more ruggedized and reliable, thereby decreasing down time and operating costs. Another object of the invention is to provide a pallet that has one or more of the characteristics discussed above but which is relatively easy to assemble using a minimum of equipment. Another object of the invention is to provide a process of manufacture that is predictable and reproducible, thereby decreasing variance and operating costs. Another object of the invention is to provide a method that has one or more of the characteristics discussed above but which is relatively simple to setup and operate using relatively low skilled workers.

In accordance with one aspect of the invention, the inventive pallet system has a pallet body which has a separately formed lower or pallet stabilizing portion (i.e., a first portion) and a separately blow molded upper or load bearing portion (i.e., a second portion) connected to the first portion. The pallet body preferably has four recesses for four-way fork access. The second or upper portion may have a non-slip topside surface, e.g., a knurled surface. The first portion is preferably made up of at least one foot which is attached to the second portion by insert molding, one rail or runner attached to the foot, and one stringer attached to the runner. In one embodiment, the first portion includes a plurality of feet secondly molded into the second or load bearing portion. The runners preferably have a ridge or protruding member for engagement with the foot, and the foot preferably includes a channel for engagement with the load bearing portion. The load bearing and pallet stabilizing portions may be pocketed, have waffle configuration, or honeycomb configuration for added weight to strength ratio.

The pockets have at least one of the following shapes: triangular, circular, square, oval, rectangular, hexagonal, and octagonal. The second or load carrying portion may also contain at least one cavity and/or perimeter lip on a topside surface for receiving a pallet stabilizing surface of another pallet in a nesting or stacking arrangement. The feet and the runners are shaped like at least one of the following: triangle, square, rectangle, parallelogram, and trapezoid. Alternatively, the foot is at least frustoconical or pyramidal shaped. Ribs may also provide attachment of the second upper portion to the runner.

Other features of the upper or load bearing portion include an end cap to cover the fork receiving recesses, and a cavity cover for covering the nesting cavities when not in use. The pallet further preferably has at least one handle hole for ease of carrying by a user. The pallet and all of its parts may be constructed of recycled HDPE plastic of a wide variety of colors.

The pallet system may further include a load identification system including at least one of the following: bar coding, hot stamping, molding in a logo, affixing a card holder, and tagging with tape, a top cap, and tie members for securing the cap to at least one pallet body.

The pallet system may further include a load identification system including at least one of the following bar coding, hot stamping, molding in a logo, affixing a card holder, and tagging with tape, a top cap, and tie members for securing the cap to at least one pallet body.

In accordance with another aspect of the invention, the inventive method of manufacturing a pallet preferably includes the steps of inserting the pallet stabilizing portion into a mold (such as a plastic, metal or wood rod) and then blow molding around the insert a load bearing portion. In one embodiment, the method of forming a plastic pallet preferably has the steps of: a) forming a first runner; b) forming a second runner; c) forming a third runner; d) inserting the runners into a mold; e) blow molding a load bearing portion in a manner which engages the runners to form a pallet; f) ejecting the pallet from the mold; g) allowing the pallet to cool before stacking them. The runners may be put into the mold by an automated arm and held in place by a spring biased or other type of clamp during the blow molding of the load bearing portion. Reinforcing members may also be inserted during this process. The members are preferably rolled steel rods that are inserted into channels in the second portion while this portion is cooling.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIGS. 22–26 depict cutaway view of other embodiments of the present invention showing the connection of the lower portion to the upper portion.

FIG. 33A is a cutaway view along D'—D' of the embodiment shown in FIG. 33;

Figure 1:
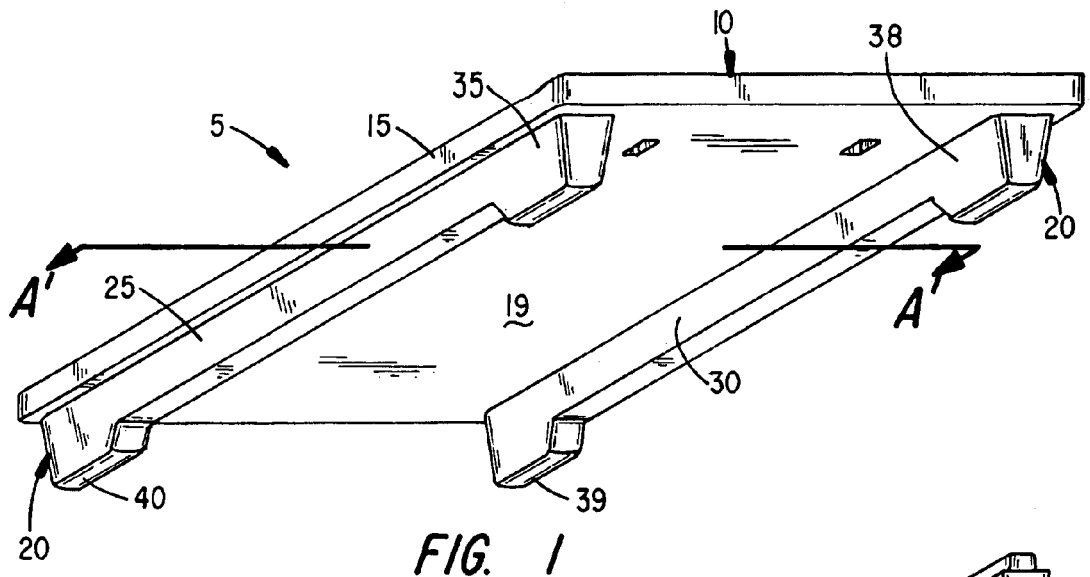
FIG. 1 is a perspective underside view of one embodiment of the pallet system of the present invention.

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected" or terms similar thereto are often used. They are not limited to direct connection but include connection through other elements where such connection is recognized as being equivalent by those skilled in the art.

DETAILED DESCRIPTION

The present invention and the various features and advantageous details thereof are explained more fully with reference to the non-limiting embodiments described in detail in the following description.

1. Preferred Embodiments

Figure 8:
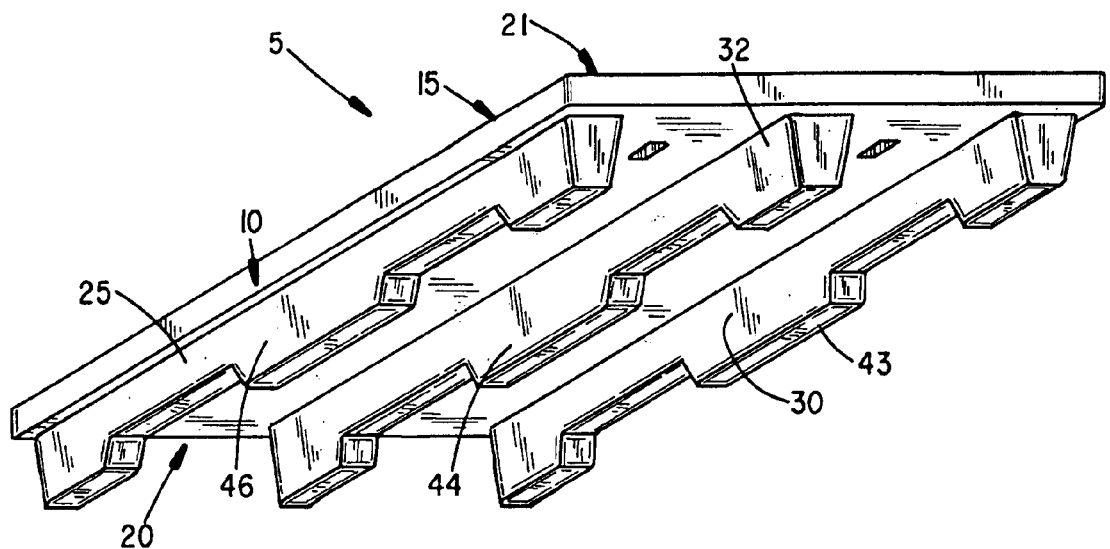
FIG. 8 is a perspective underside view of another embodiment of the pallet of the present invention.
Figure 9:
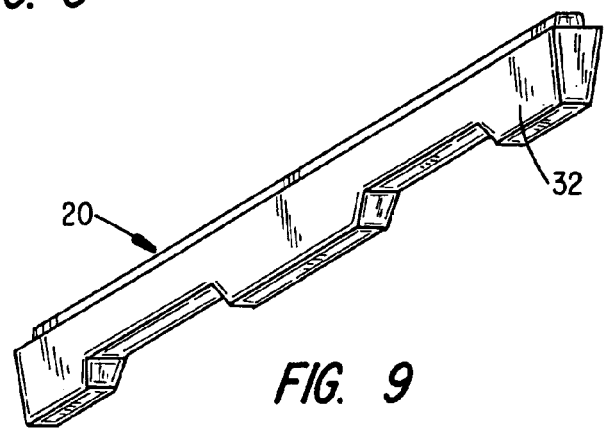
FIG. 9 is a perspective view of the pallet runner shown in FIG. 8 of the present invention.
Figure 10:
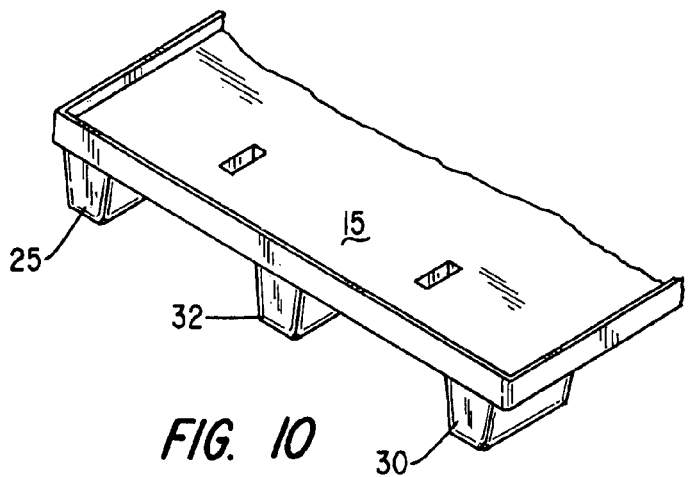
FIG. 10 is a perspective topside view of FIG. 8 of the present invention.

As shown in FIG. 1, pallet system 5 contains a body 10 which includes an upper or load bearing component or portion 15 and a lower or pallet stabilizing component or portion 20. The upper or second portion 15 preferably includes topside surface 18 and underside surface 19 on a top deck 21. In the lower or first portion 20 may include several feet and/or rails or runners attached thereto. For example, at each of the four corners a first foot 35, a second foot 38, a third foot 39, and a fourth foot 40 may be either integrally or separately formed into the top deck 21. In the preferred embodiment at least two rails, a first rail or runner 25 and a second rail or runner 30, are then either integrally or separately connected to the feet 35, 38, 39 and 40. Additional rails or runners may be added for additional strength and additional feet may be added as well (see, e.g., FIGS. 5–10). One runner is typically 48 inches long. As shown in FIGS. 8–10, additional feet 43, 44, 46 of different sizes may also be present.

Figure 2:
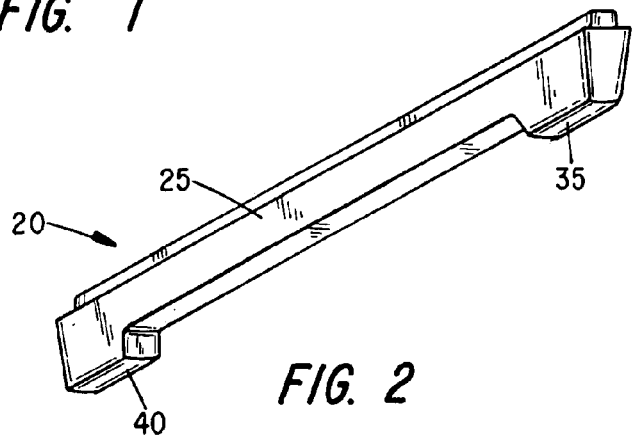
FIG. 2 is a perspective view of the pallet runner shown in FIG. 1 of the present invention.
Figure 3:
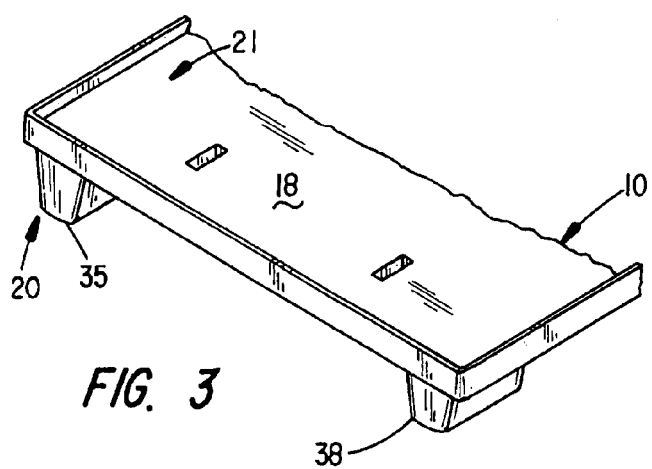
FIG. 3 is a perspective topside view of FIG. 1 of the present invention.
Figure 4:
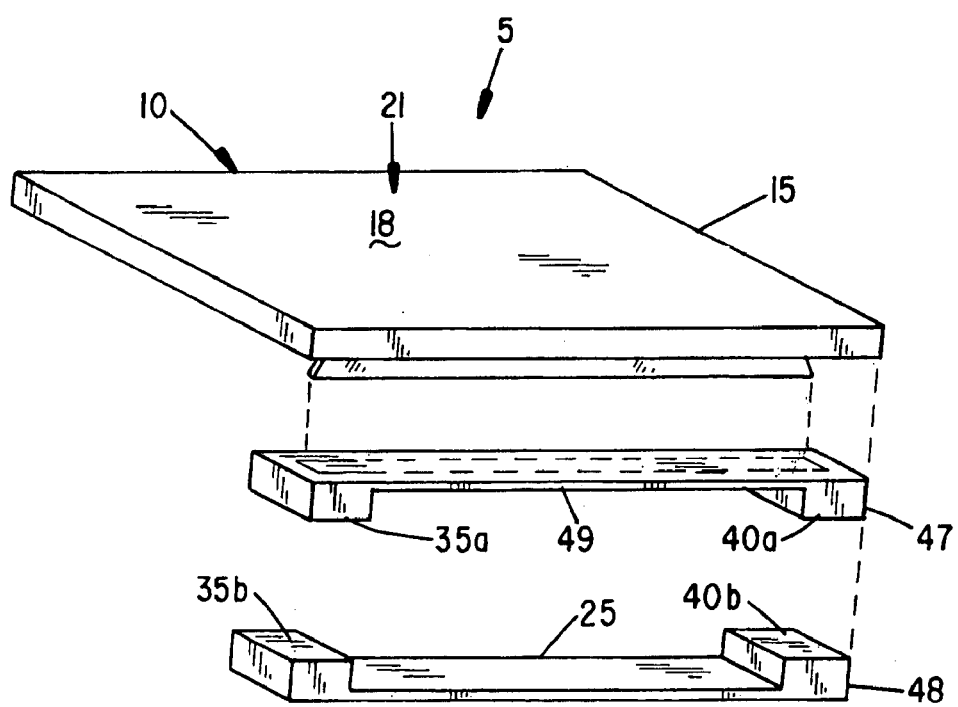
FIG. 4 is a perspective view of another embodiment of the present invention.

The rails or runners 25, 30 and feet may be separately formed as individual parts (see FIG. 2) or may be molded into an upper half 47 and a lower half 48 as shown in the embodiment at FIG. 4. These pieces are separately blow-molded then they may be insert molded to join them to the opposite half. Alternatively, the feet and rails may be formed by injection molding, rotomolding, winding, thermoforming, etc. In this embodiment, the feet 35, 40 are formed from first foot portion 35a, 40a and second foot portion 35b, 40b. The first portions 35a and 40a are preferably connected by an upper rail 49. Although not shown, a similar structure may be utilized for other feet and runners. For example, if the upper half 47 is first blow molded, it may be inserted into another mold and the bottom half 48 is then newly blow molded in such a way so that the two pieces 47, 48 become connected through the blow molding process. In the same way, upper half 47 and lower half 48 shown in FIG. 4 may be blow molded to the top deck 21. Alternatively, upper half 47 may actually be initially integrally blow molded as part of the deck 21. In this embodiment the half 47 may be in the lower half of the part mold while the deck may be in the upper half of the part mold. After the pieces have been combined through the insert molding process, they form the body 10 of the pallet system 5. For example, once the upper half 47 and lower half 48 are blow molded together, the combined pieces may be inserted into a new mold and the second upper portion 15 may be blow molded around them.

Figure 5:
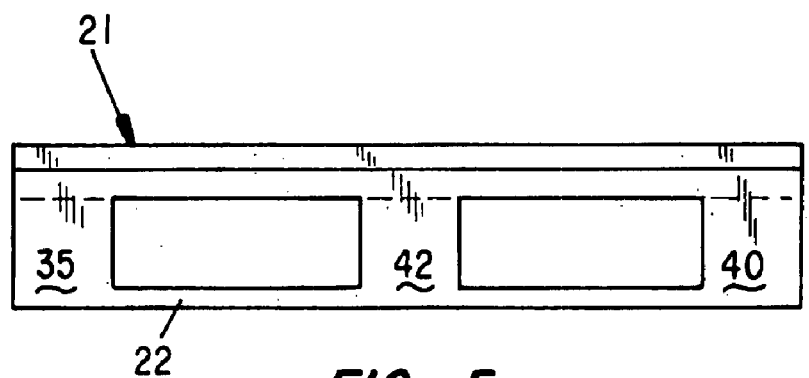
FIG. 5 is a side view of another embodiment of the present invention.
Figure 6:
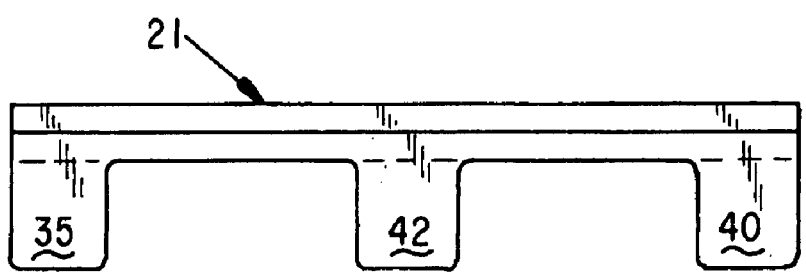
FIG. 6 is a side view of another embodiment of the present invention.
Figure 7:
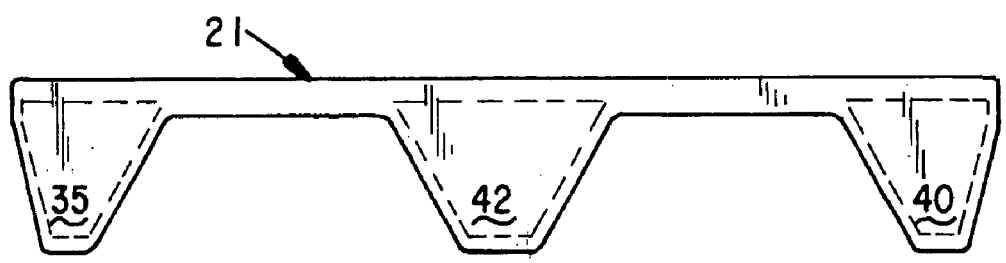
FIG. 7 is a side view of the embodiment of the present invention.

As shown in the embodiments shown in FIGS. 5, 6 and 7, there are many variations on the pallet foot and rail structure. In addition, another foot 42 or series of feet may be added to provide more structural rigidity. For example, a bottom deck 22 may be separately or integrally blow molded into the top deck and rails to create the embodiment shown in FIG. 5. Alternatively, it is possible that a plurality of feet 35, 40, 42 are inserted into a mold and the top deck 21 will be blow molded around them as shown in the embodiment in FIG. 6. Also possible is the embodiment shown in FIG. 7 in which the triangular-shaped feet 35, 40, 42 are separately blow molded and then a top deck 21 with feet is blow molded around them, totally encapsulating the first molded feet through the insert molding process.

It will be apparent to one of ordinary skill in the art that the addition of feet and/or rails will further make the pallet 5 structure stronger. Thus, the embodiments shown in FIGS. 8–10 and 11–12 have nine feet and three runners. The rails 25, 30 and 32 are incorporated into the upper or second portion 15 in FIGS. 8–10; and each of the feet 35, 40 and 42 are separately incorporated in similar fashions into the second portion 15 in FIGS. 11 and 12. Alternative, exemplary molded couplings of the feet 35, 40 and 42 to the second portion 15 are depicted in FIGS. 38–42 in regard to section lines E—E and F—F at FIG. 12. The molded couplings shown at FIGS. 38–42 are similar to the molded couplings of the rail portions 25, 30 and 32 shown at FIGS. 16 and 21–24.

Figure 11:
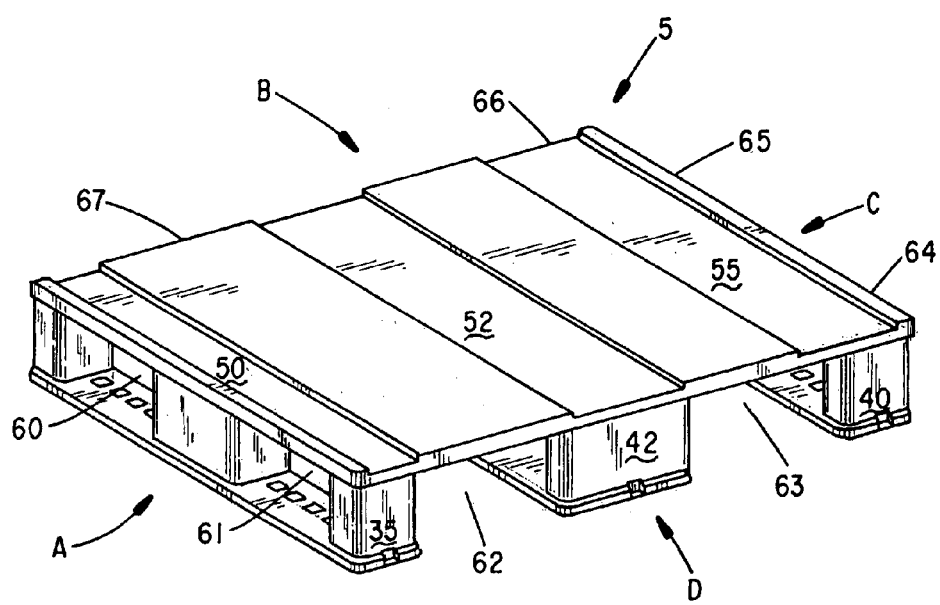
FIG. 11 is a perspective topside view of another embodiment of the present invention.

As shown in FIG. 11, this embodiment preferably also has first cavity 50, a second cavity 52, and a third cavity 55 to receive the runners and/or feet when similar pallets 5 must be stacked for storage. The depths of the cavities may vary depending on a variety of factors such as thickness of the plastic and the dimensions of the feet and/or runners.

The embodiment in FIG. 11 is known as a four way pallet because the forks (not shown) of a fork lift (not shown) can be inserted into the pallet in four different directions A, B, C, D. The pallet preferably, as shown in FIG. 11, has recesses for receiving the forks (60, 61, 62, 63, 64, 65, 66 and 67). The recesses 60–67 may vary in depth and width depending on the type of pallets and may also vary in number. For example, like in FIG. 1, in the embodiment shown in FIG. 11 there are four recesses for the fork to enter in this four-way pallet. Alternatively, pallet 5 may be a two-way pallet as shown in FIG. 13 and thus it will have fewer recesses.

Figure 12:
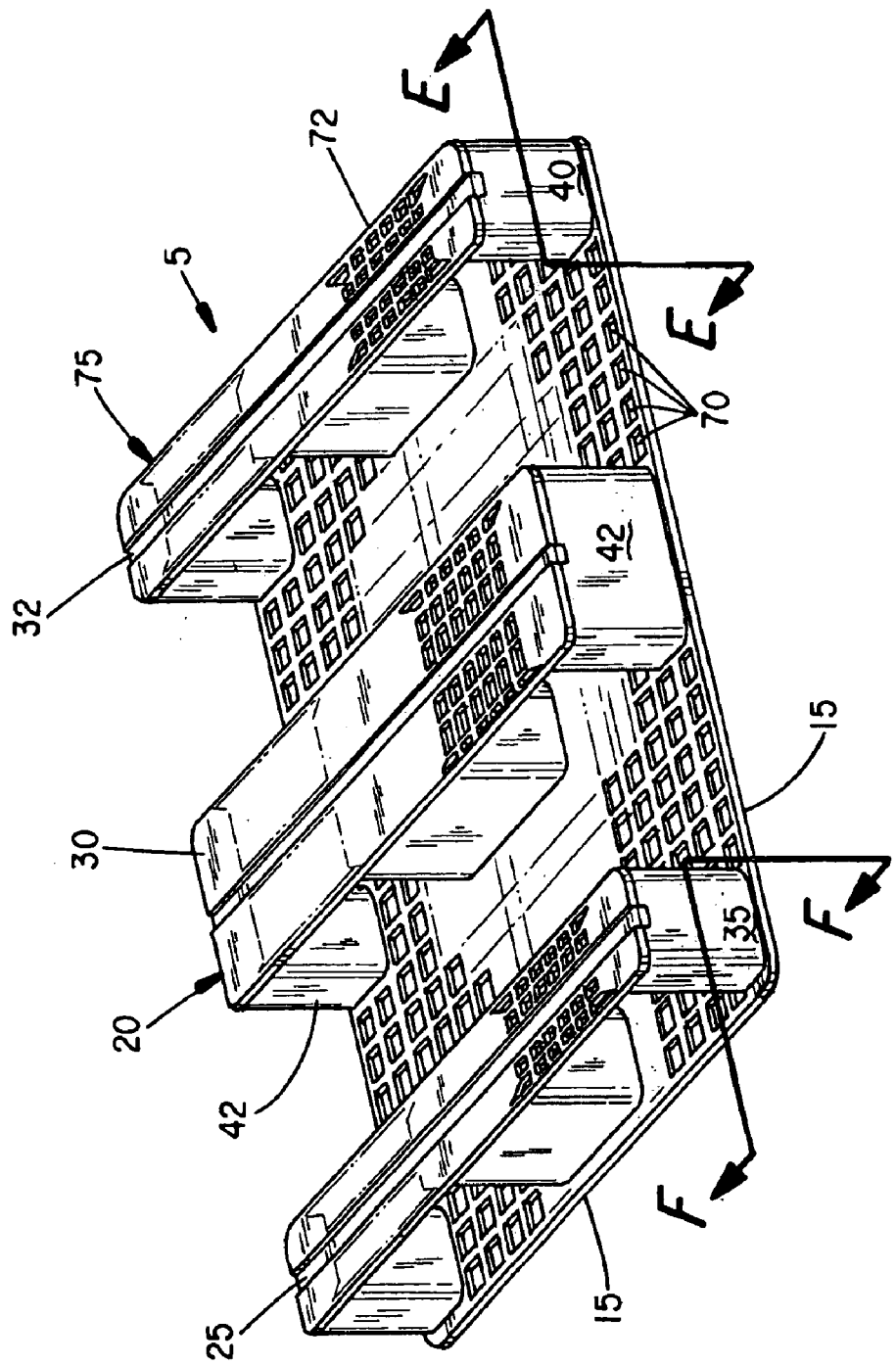
FIG. 12 is a perspective underside view of FIG. 11 of the present invention.
Figure 13:
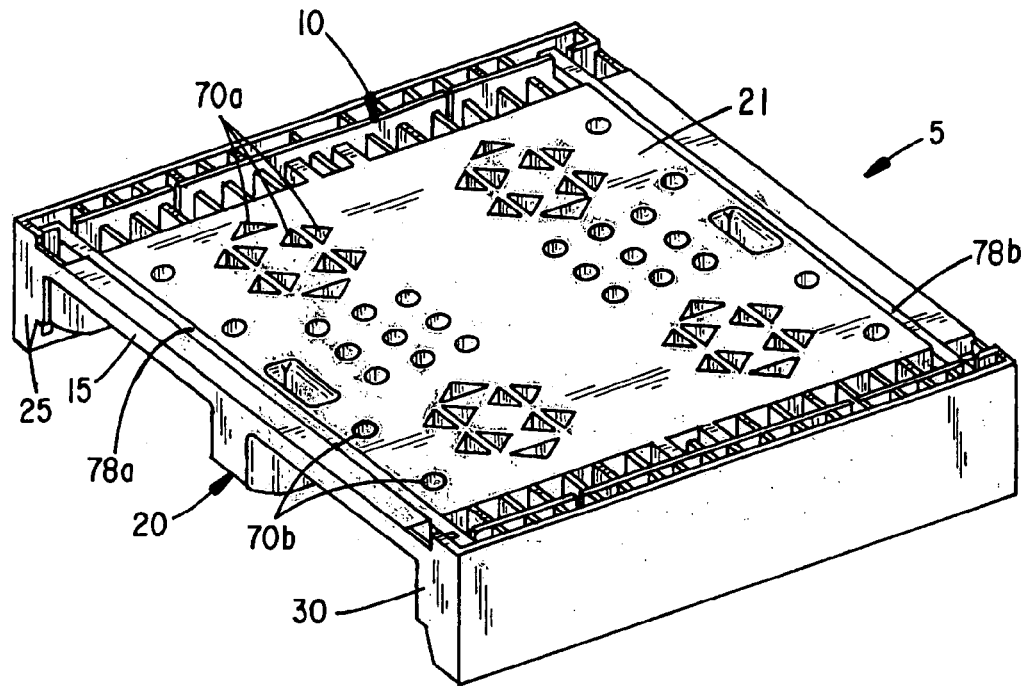
FIG. 13 is a perspective view of another embodiment of the present invention.

As shown in FIGS. 12 and 13, pockets may be incorporated into the design of the second or upper portion 15 and the first or lower portion 20 to add strength and/or reduce weight. Such honeycomb or waffle designs are often used when molding plastics. The pockets 70 may vary in dimensions and shape (e.g., triangles 70a or circles 70b). The pockets 72 on the lower portion 20 may also vary in dimension and shape. The embodiment shown in FIG. 12, the pockets 72 may also serve to give the lower portion 20 an anti-skid underside surface 75 so the pallet 5 does not slip off the forks. However, this may also be done by merely the addition of knobs, knurling, a rubberized coating and/or rubber grommets. The topside surface (not shown) of the broken portion may also be pocketed. As shown in the embodiment in FIG. 13, at least one, here two, metal rods 78a, 78b may be insert molded into the pallet 5. One way of doing this is by laying the rods into the mold and then blow molding the pallet around them. Another way is to push these rods 78a, 78b in prior to the second portion's cooling. These reinforcing rods 78a, 78b may also be constructed of wood or plastic.

Figure 14:
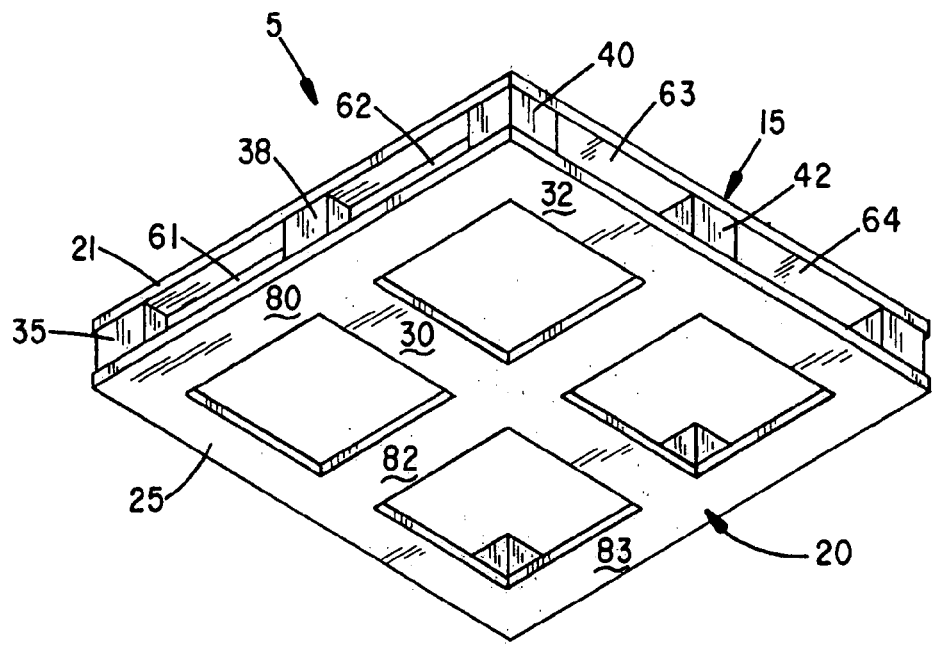
FIG. 14 is a perspective underside view of another embodiment of the present invention.
Figure 15:
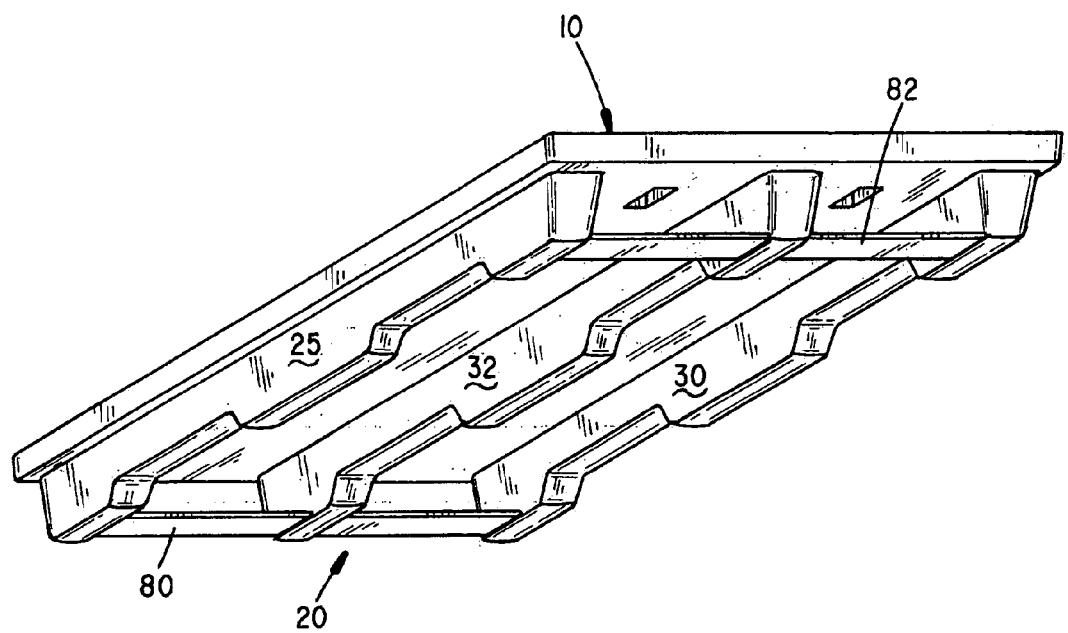
FIG. 15 is a perspective underside view of another embodiment (like FIG. 8) of the present invention including stringers.
Figure 16:
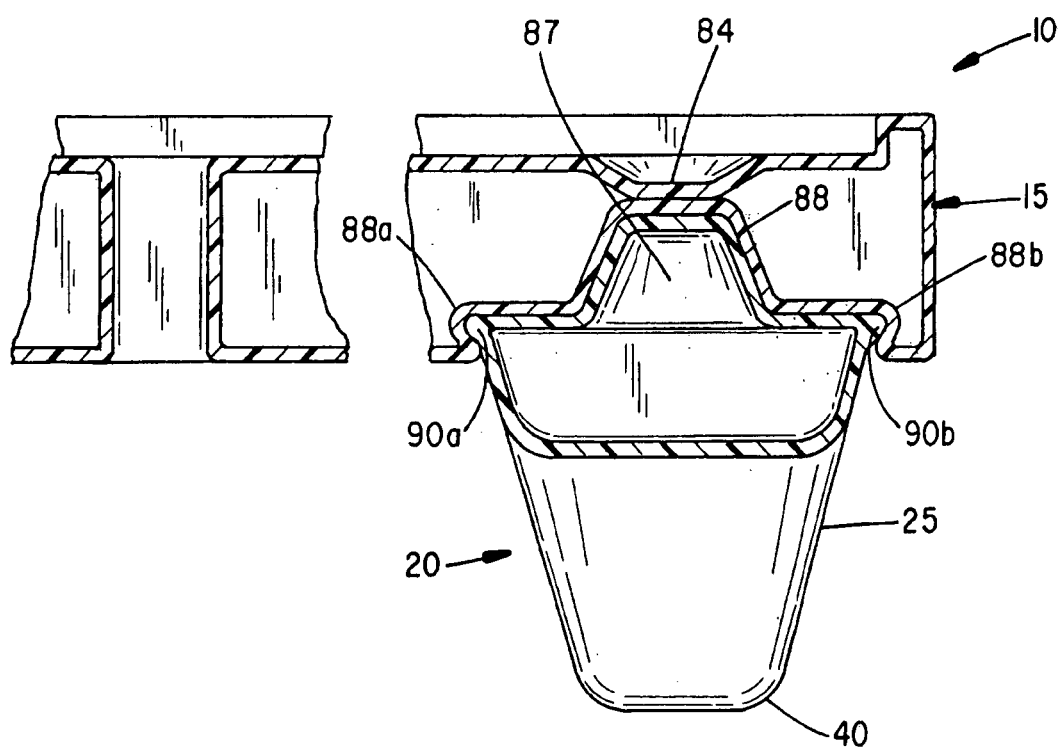
FIG. 16 a cutaway view along A'—A' of FIG. 1 of the present invention.
Figure 17:
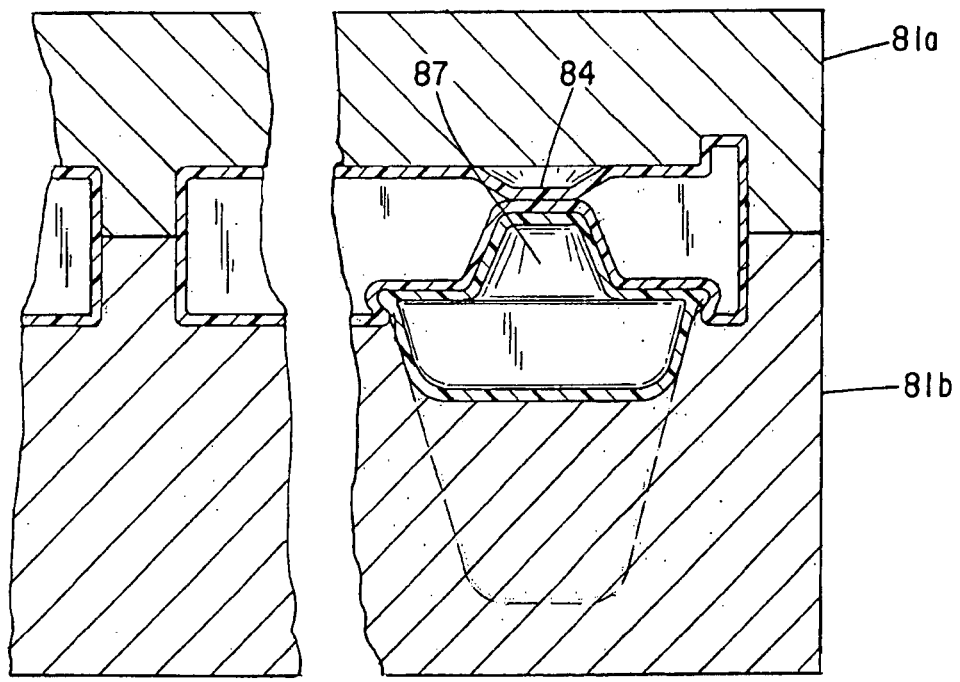
FIG. 17 is a cutaway view of the embodiment of FIG. 1 shown in a mold.
Figure 18:
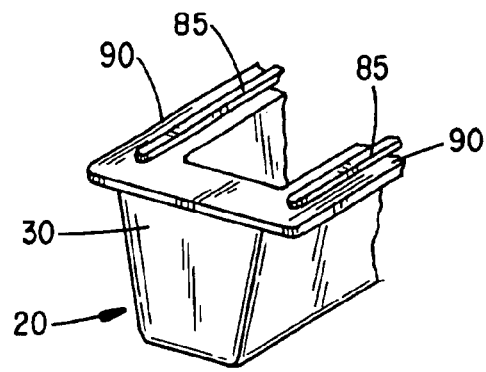
FIGS. 18–20 are various perspective views of another embodiment of the pallet runner of the present invention.
Figures 19, 20:
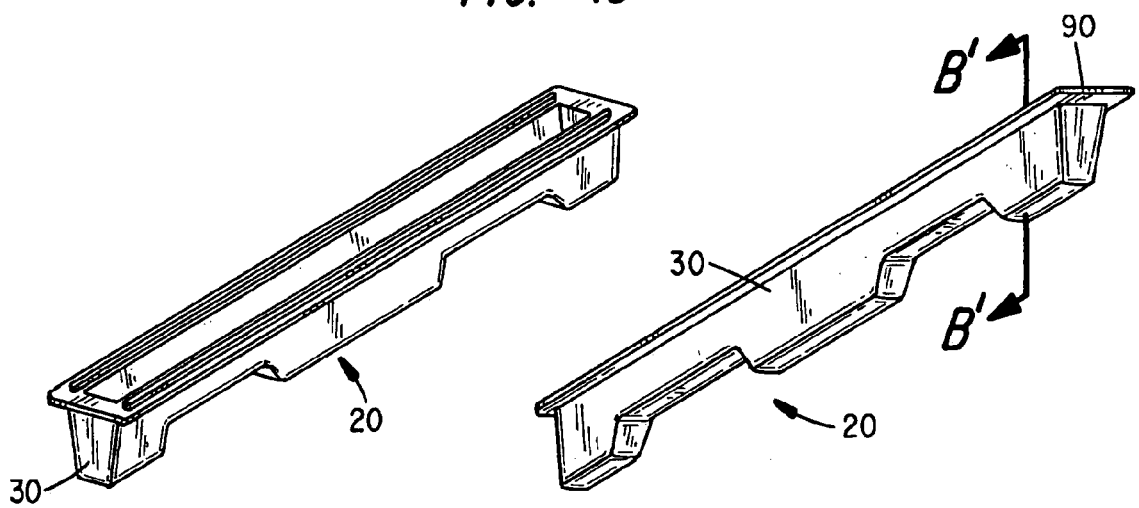
Figure 21:
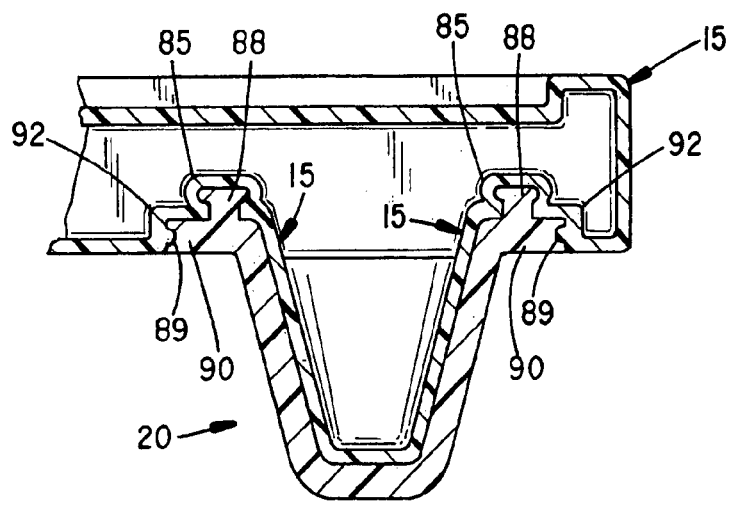
FIG. 21 is a cutaway view (along B'—B' of the runner of FIG. 20) of still another embodiment of the present invention showing the incorporation of the runner shown in FIGS. 18–20.

In the embodiments shown in FIGS. 14–15, at least one stringer (e.g., 82) may be attached to the rails 25, 30, 32 to add additional strength and stability to the pallet 5. In the embodiment shown in FIG. 14, a first stringer 80, a second stringer 82, and a third stringer 83 connect to the rails 25, 30, and 32. Again, the insert blow molding process can be used to connect the stringers 80, 82 and 83 to the rails 25, 30, 32. Alternatively, a post molding process may be used where the plastic or metal stringer is inserted prior to the runners cooling.

As shown in FIGS. 16–21, the second portion 15 and/or first portion 20 may have either ribs 85 or protruding members, such as ridges or flanges, 90 and channels 88 or holes 92 to engage each other during the insert blow molding process. For example in FIG. 16, the second or upper portion 15 contains channels 88, 88a, 88b, which are engaged by protruding ridges 90 in the runner 25. Kiss off 84 helps to further connect runner 25 to the top deck 21 as the runner's crown 87 is pressed against the kiss off 84 within the first mold half 81a and the second mold half 81b (see, e.g. FIG. 17). This also helps to strengthen that point.

In FIGS. 18–21, protruding members or flanges 90 and ribs 85 are received in hole 92 and channels 88, respectively. In this embodiment, first the rail 30, ribs 85, and protruding members 90 are blow molded. Then they are set and appropriately exposed into a cavity in a mold for a second or upper portion 15 to be insert blow molded into connection with the second portion 15. A lip 89 and groove 91 may also be employed as well. This deep draw molding process strengthens the connection between the portions 15, 20.

Figure 27:
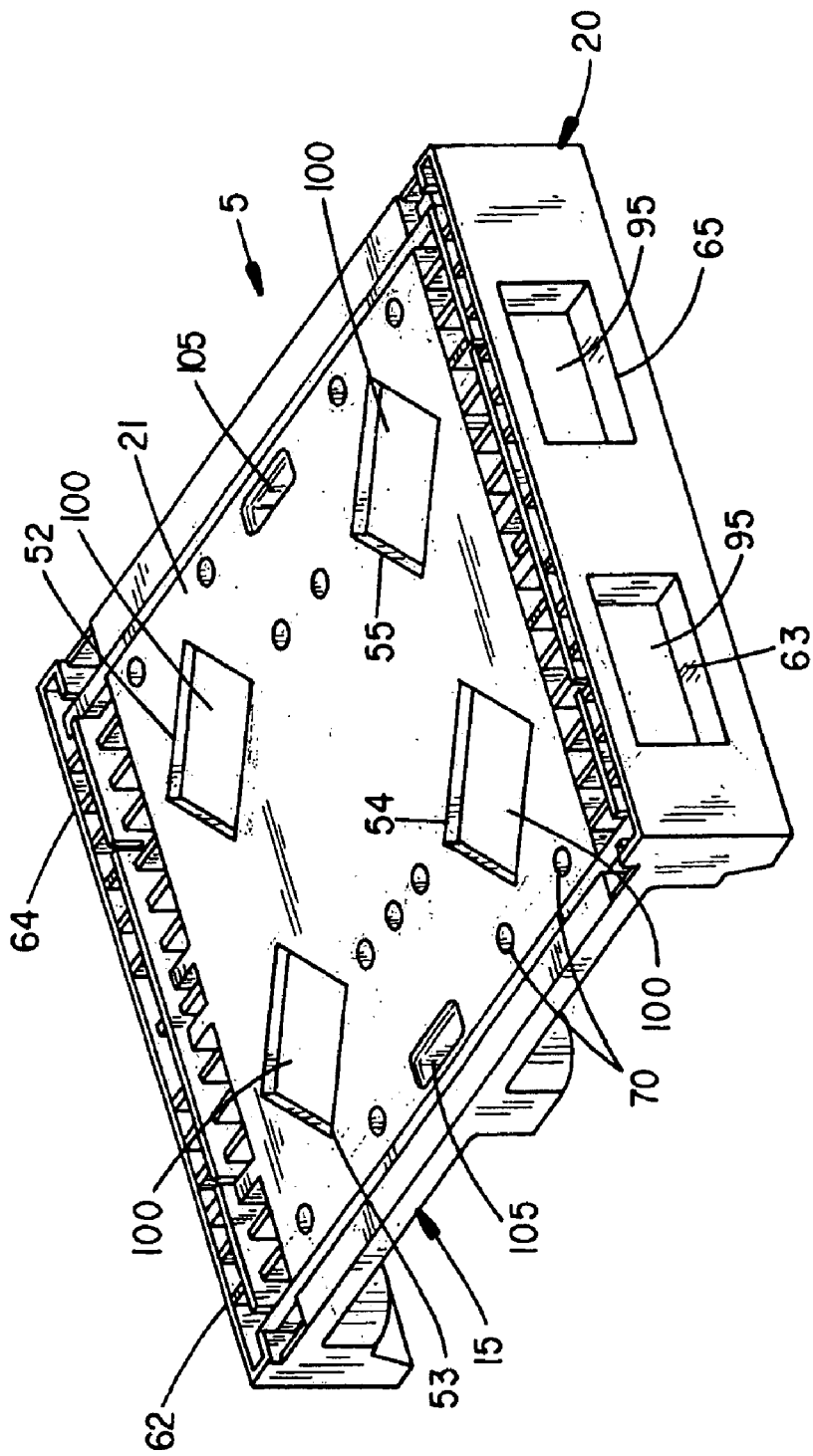
FIG. 27 is a perspective view of another embodiment of the present invention.
Figure 28:
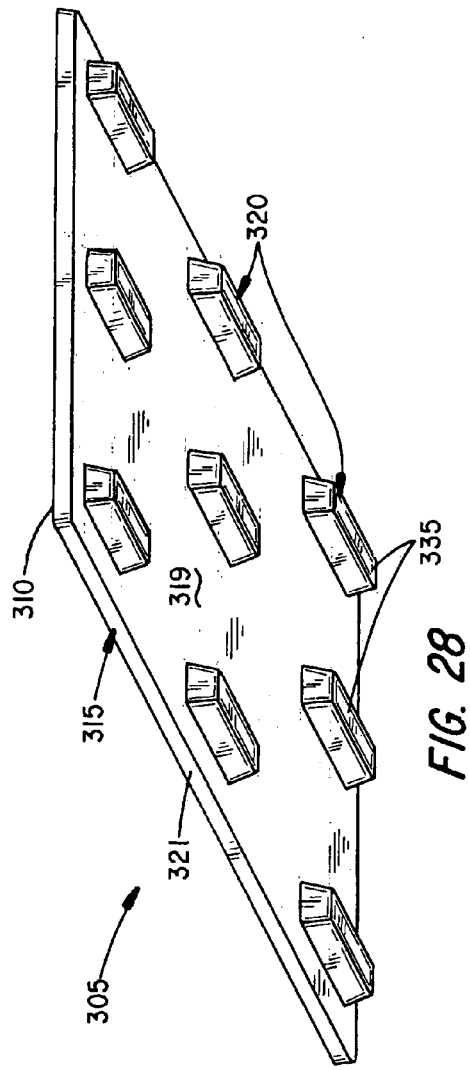
FIG. 28 is a perspective underside view of another embodiment of the present invention.
Figure 29:
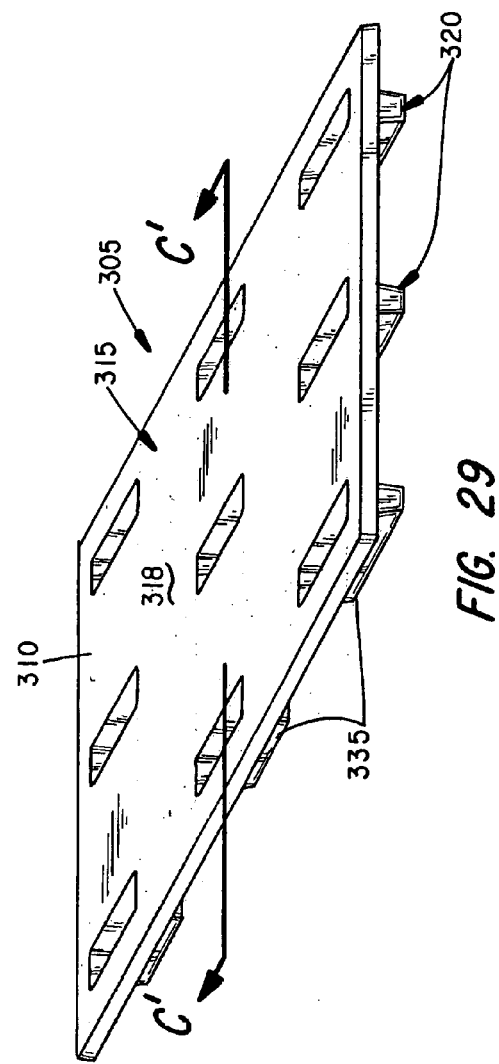
FIG. 29 is a perspective topside view of the pallet system shown in FIG. 28.

As shown in FIG. 27, this embodiment has holes or recesses bore through rectangular-shaped runners. The recesses are for receiving the lifting tines of a forklift. When not in use, an end cap 95 may be used to block the recesses 62–65 in the first portion 20. The end cap 95 may limit entry on one or more sides of the pallet 5. This may keep vermin out from underneath the pallet and/or limit access by the forks of the forklift. In the embodiment shown in FIG. 27, one or more cavity covers 100 may also be employed to cover the cavities 52–55 on the second upper portion 15. As indicated previously, these cavities normally receive a foot (not shown) and/or a runner (not shown) of another pallet while nested. Cavity covers may be used to also keep out vermin or other materials and provide further stability to the top deck 21 of the pallet. These covers (100) are generally flush with the topside surface 18 so that loads do not get hung up. A recess and a lip may be added to the cover and the cavity for a tighter fit. A handle hole 105 may also be provided in at least one or more positions on the pallet 5 to allow for easy handling and caring by a warehouse worker. It is important to note that all the various holes, recess, and cavities can be configured and arranged in a blow-molded plastic pallet to decrease weight and increase strength.

Figure 30:
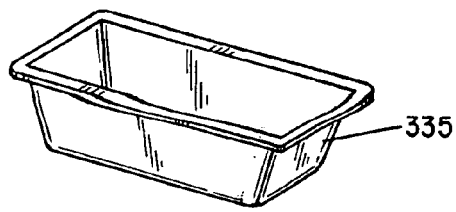
FIG. 30 shows one embodiment a foot of the pallet system shown in FIGS. 28–29.
Figure 31:
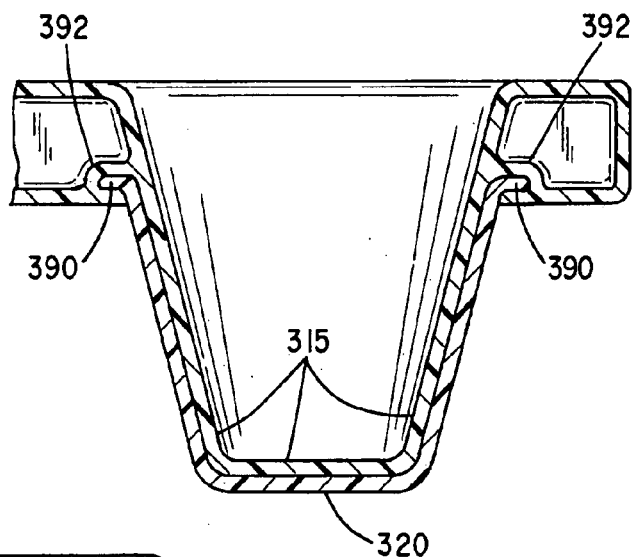
FIG. 31 is a cutaway view along C'—C' of the embodiment of FIG. 29.
Figure 32:
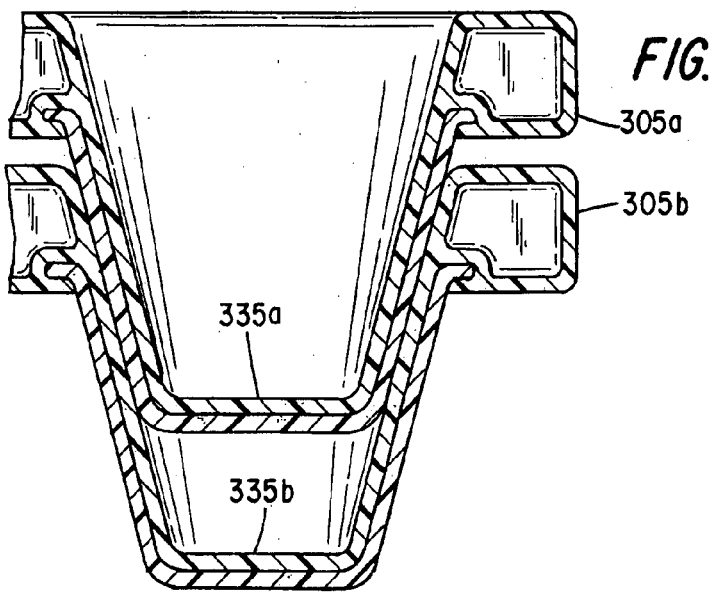
FIG. 32 is a cutaway view of two pallets like the one shown in FIG. 28 nested and stacked.

FIGS. 29–32, show another more light weight embodiment of the blow molded pallet system of the present invention. Again this pallet system 305, has a body 310 including a lower or first portion 320 and upper or second portion 315. A deck 321 is on the top of the second portion 315 and has a topside surface 318 and an underside surface 319. As best shown in FIG. 30, this embodiment preferably has individual hollow feet 335 which collectively form the first or lower portion 320. As shown in FIG. 31, a deep draw blow molding process may also be used to manufacture this embodiment. Again the deep draw process incorporates the first portion 320 into the second portion 315. This embodiment also allows for interlocking of the protruding members 390 into holes 392. FIG. 32 shows how several pallets, e.g., 305A and 305B of this type can be nested and stacked together as the feet, e.g., 335A, 335B of the different pallets 305A, 305B fit into each other.

Figure 33:
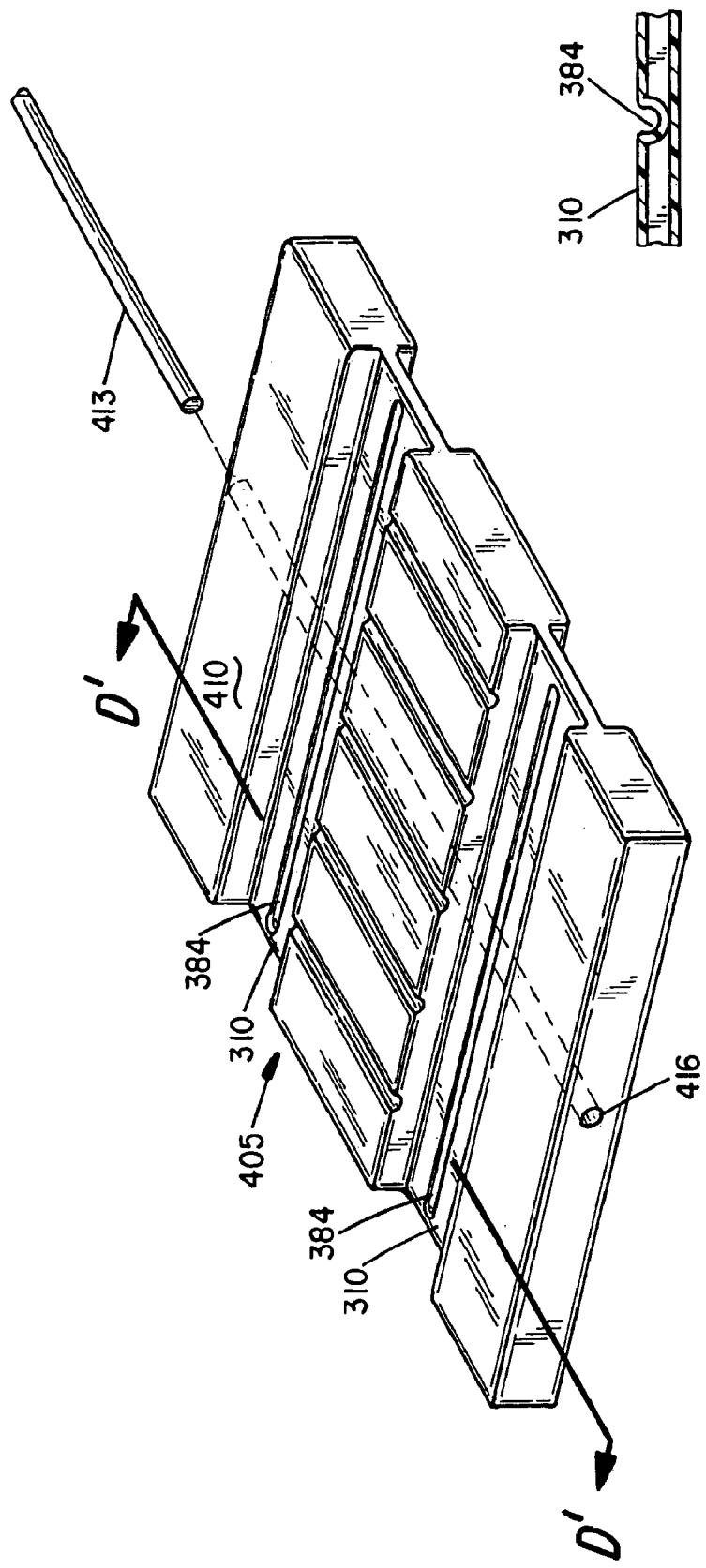
FIG. 33 is a perspective topside view of another embodiment of the present invention.
Figure 34:
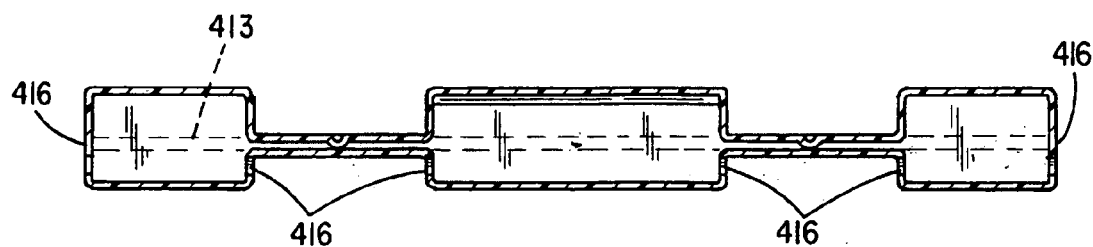
FIG. 34 is a cutaway view along D'—D' of the embodiment shown in FIG. 33.

FIGS. 33, 33A, 34 show an embodiment of another lighter weight (e.g., less than 25 pounds) blow molded pallet system 405. This pallet is preferably 40 inches wide, 48 inches long, and 4.5 inches high. A pallet body 410 of the pallet system 405 may be blow molded as a single piece and then an insert, e.g., a tube or rod 413 may be inserted into the body 410 along a channel 416 after the molding is complete. This is sometimes referred to as post molding. The insert is preferably about 40 inches long and is fabricated separately from plastic, metal or, wood. Alternatively, the insert may be placed into the pallet body mold and the body is then blow molded around it. One or more inserts may be used to increase the strength of the pallet system. If the insert 413 is not plastic, the insert should be removed before the pallet body is ground up during the recycling process. As shown in FIG. 33A, one or more kiss offs 384 may be incorporated in the pallet body 310 design to add strength and reduce weight.

Figure 35:
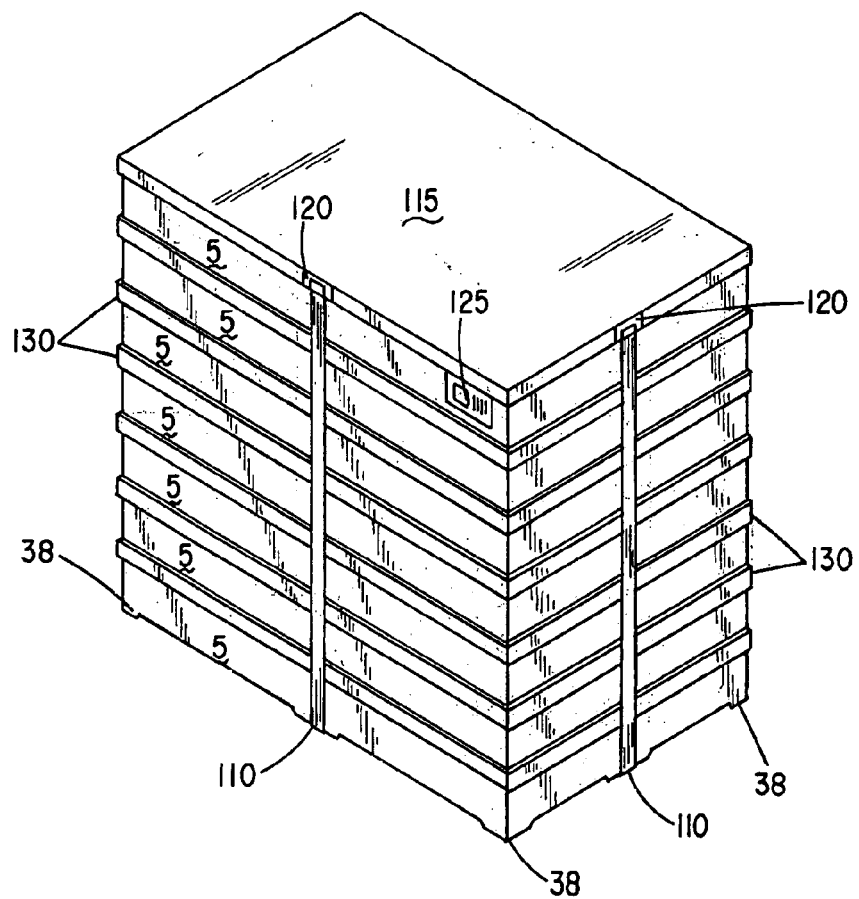
FIG. 35 is a perspective view of another embodiment of the pallet system present invention.

FIG. 35 shows stacked pallets nested and tied together with a strap or tie 110 and a top cap 115. The top cap 115 preferably has at least one metal reinforcing member 120 insert molded therein to retain the tie 110. One or more pallets may have a load identification system 125 as shown. FIG. 35 shows nested or stacked pallets 5 with a perimeter lip 130. Foot 38 engages lip 130. The tie 110 preferably is inserted through a hole found in the pallet body deck (see FIG. 1).

Suitable materials for producing the inventive plastic pallet include virgin or recycled polyolefins, polyethylene (PE), polyvinyl chloride (PVC), acrylonitrile butadiene, styrene (ABS) plastics, polypropylene, polyamides (PA), and polycarbonates (PC) of one or more colors. The preferred embodiments are made of 100% reground and recycled ultrahigh molecular weight high-density polyethylene (HDPE-UHMW). Polypropylene homopolymer, or polypropylene block copolymer may also be used for the various parts of the pallet body. A suitable friction material may be selected from polyolefins containing materials like LLDPE, TPE, EVA, EEA and the like to stop things from sliding off the topside surface 18 of the pallet or to further add friction to the underside of the first portion of the pallet.

2. In Use and Operation

Figure 36:
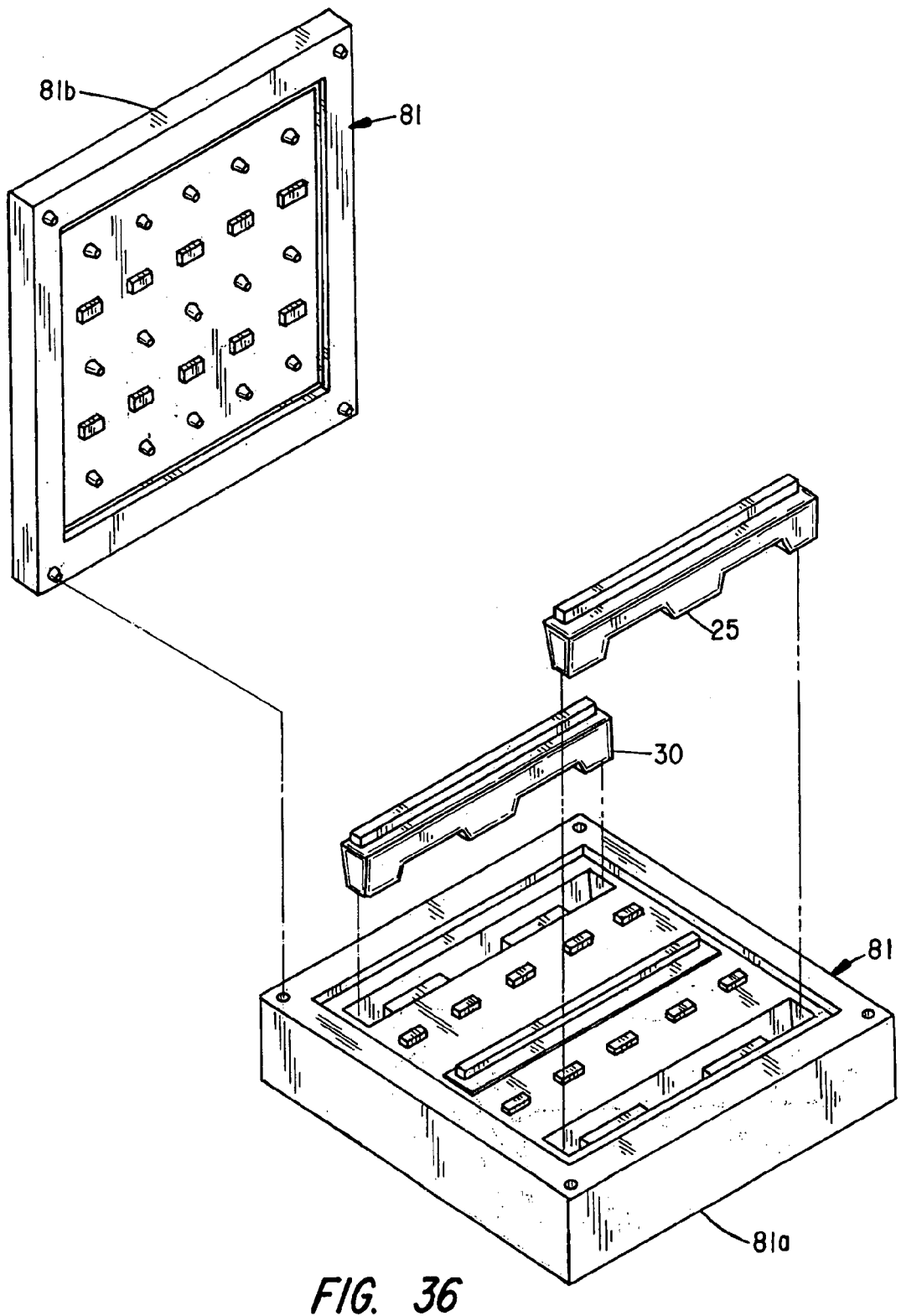
FIG. 36 is a perspective view of a pallet mold and one embodiment of the pallet system present invention.

As indicated above, in the preferred embodiment there may be one or more molds which independently and separately form (e.g., blow-mold) feet, runners and stringers. As shown in FIG. 36, there is also preferably a mold 81 having two halves 81a and 81b which separately blow molds a second or upper portion, and a first portion. In the preferred embodiment, the second upper portion and first portion molds have a position for receiving feet, runners 25, 30, and/or stringers. Typically, each mold is constructed of a right half 81a and left half 81b.

Figure 37:
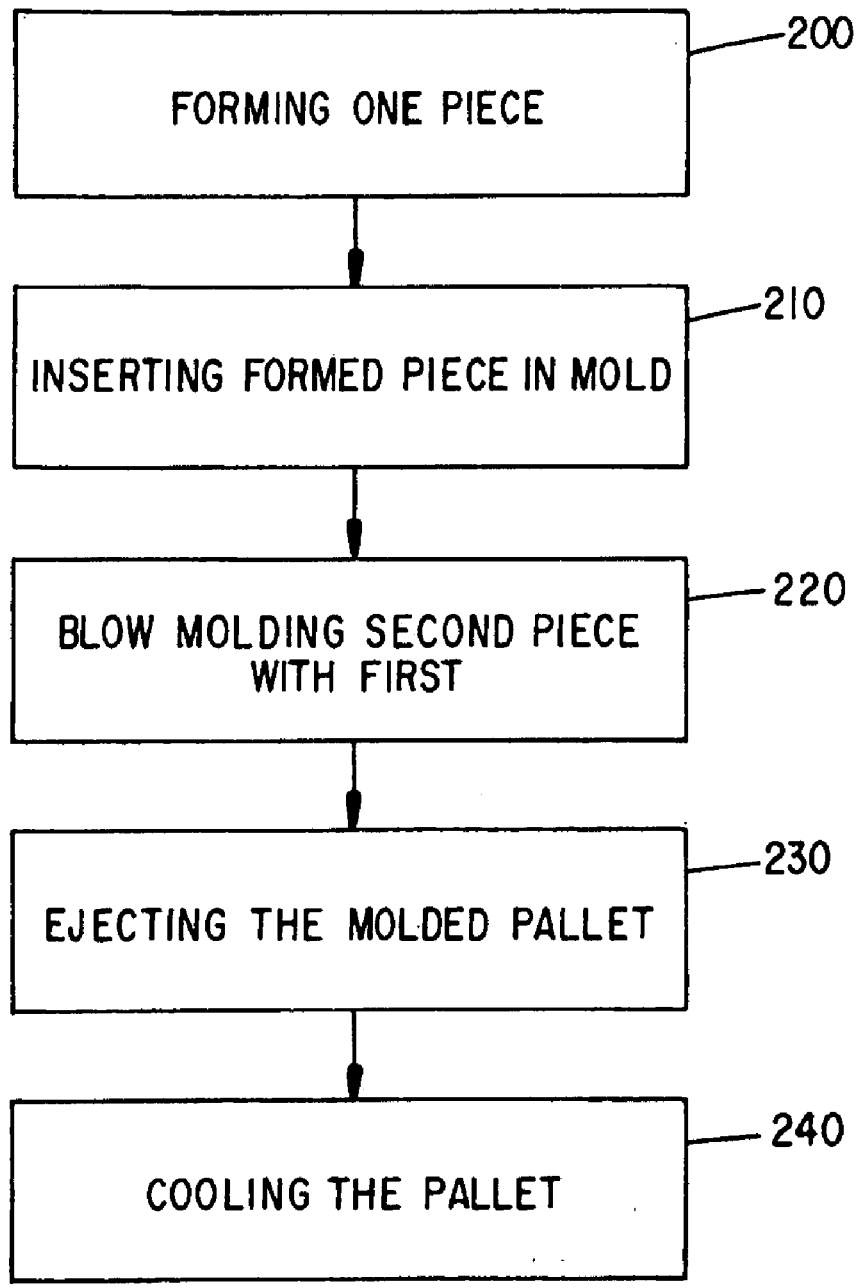
FIG. 37 is a flowchart illustrating the inventive blow molding method.
Figure 38:
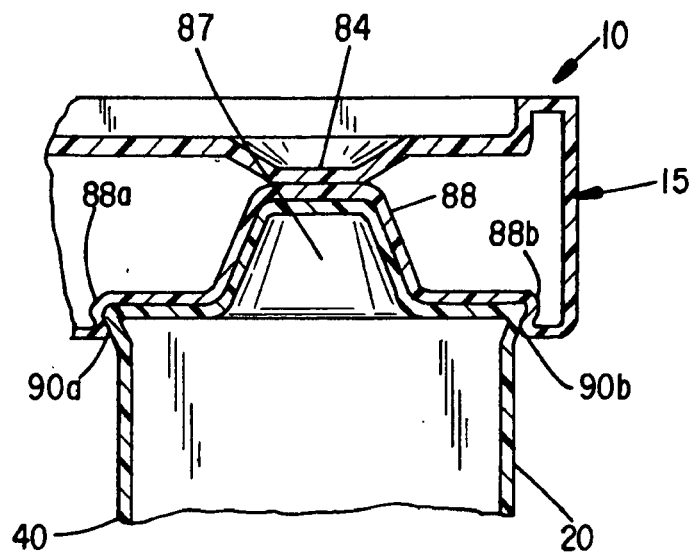
FIG. 38 depicts a cross section view taken along section line E—E of FIG. 12 showing the connection of feet to the upper portion.
Figure 39:
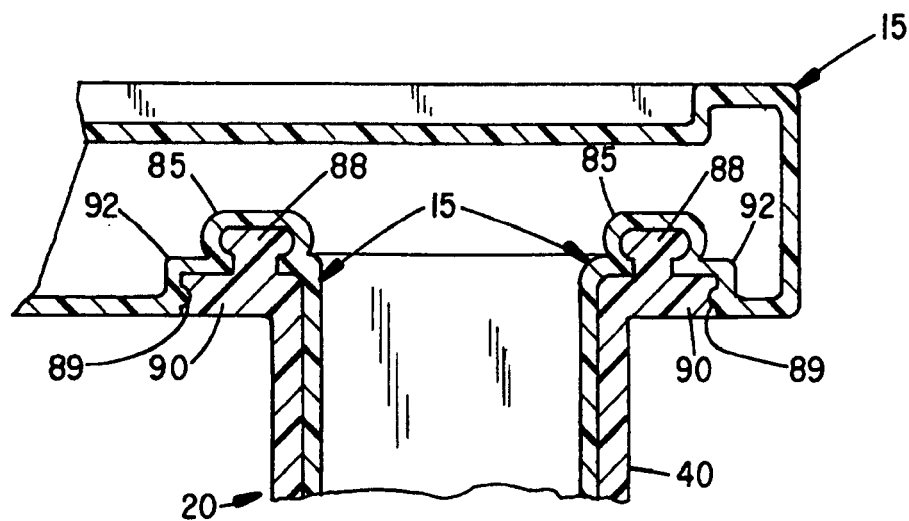
FIGS. 39–42 depict cross section views taken along section line F—F of FIG. 12 showing alternative connections of feet to the upper portion.
Figure 41:
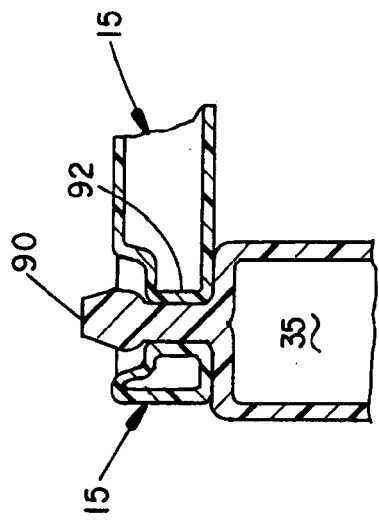
Figure 42:
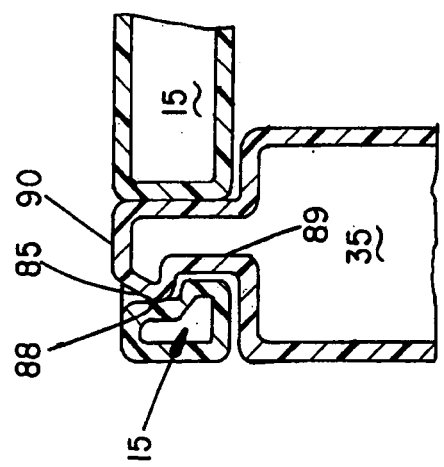
Figure 40:
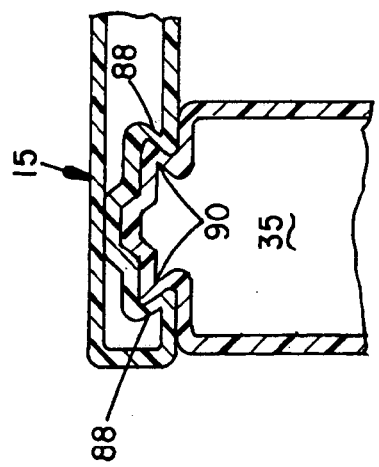

As illustrated in FIG. 37, the separately formed 200 pieces (e.g., feet, runners, etc.) are then inserted 210 into the deck portion mold and the deck portion is blow molded into or around the feet, stringers, and/or the rails 220. In one embodiment, gravity holds the inserts (e.g., the feet, runners, rods and stringers, etc.) in place during the blow molding of the deck. In another embodiment, pins that may be tensioned or spring biased hold the feet, stringers, and/or runners in place in the deck mold. Because the insert molding process adds steps and time to the molding of the pallet, automating the steps can help reduce the impact of these factors. Also, automation increases reproducibility and thus quality control.

After the pallet is completely formed, it is ejected 230 from the mold and allowed to cool 240. In one preferred embodiment, the mold for the deck has the flexibility to receive either one or a plurality of rails and/or feet depending on the type of pallet requested by the customer. For example, Customer A1 may only want a pallet with a top deck, four feet, and a bottom deck, while Customer B2 may want a pallet with a top deck, six feet, and three runners. These first portion pieces may all be first independently molded and then inserted into a larger mold so that the inserts may be blow molded together with the deck portion to form the complete pallet end product requested by the customer. Alternatively, for example, a blow molded bottom deck may be added later while still warm by affixing it to the feet by some means such as an adhesive, a channel/protruding member combination, a screw/fastener or some other means.

The individual components described herein need not necessarily be formed in the disclosed shapes, or assembled in the disclosed configuration, but could be provided in virtually any shape, and assembled in virtually any configuration. Further, although the feet and runners are described herein as physically separate modules, it will be manifest that it may be more fully integrated into the deck portions. Furthermore, all the disclosed features of each disclosed embodiment can be combined with, or substituted for, the disclosed features of every other disclosed embodiment except where such features are mutually exclusive. Finally, it is intended that the appended claims cover all such additions, modifications and rearrangements. Expedient embodiments of the present invention are differentiated by the appended subclaims.

What is claimed is:

1. A pallet comprising:
   a pallet stabilizing component including a plurality of support portions and a plurality of attachment portions; and
   a load bearing component having a hollow interior cavity space defined between upper and lower surfaces and wherein an attachment portion of said load bearing component is blow molded to include a plurality of attachment surfaces having shapes that are conformally bonded and interlocked in complementary mating relation with each of said attachment portions and whereby said pallet stabilizing component is integrated into said load bearing component.

2. The pallet of claim 1 further comprising four recesses for four-way access.

3. The pallet of claim 1 wherein the pallet stabilizing component includes a plurality of runners.

4. The pallet as set forth in claim 1 wherein said pallet stabilizing component includes a plurality of feet and wherein each attachment surface is blow molded to conformally bond and interlock with each of said plurality of feet.

5. The pallet as set forth in claim 1 wherein said plurality of support portions comprise a plurality of runners and wherein each runner includes a plurality of feet.

6. The pallet of claim 1 wherein the load bearing component comprises a waffle configuration.

7. The pallet of claim 1 wherein the pallet stabilizing component comprises a honeycomb configuration.

8. The pallet of claim 1 further comprising a recess for receiving forks of a fork lift.

9. The pallet of claim 1 wherein an underside surface of the load bearing component has pocket formed to provide anti-slip properties.

10. The pallet of claim 1 wherein a bottom of the pallet stabilizing component has pockets for varying the weight to strength ratio.

11. The pallet of claim 1 wherein the load bearing component is a first color; and wherein the pallet stabilizing component is a second color.

12. The pallet of claim 1 wherein the pallet stabilizing component is blow molded.

13. The pallet of claim 1 wherein said pallet stabilizing component is comprised of at least one of the following materials: wood, metal or plastic.

14. A method of blow molding a pallet comprising the steps of
   a) forming a pallet stabilizing component having a support portion and an attachment portion;
   b) inserting the pallet stabilizing component into a mold and exposing said attachment portion in a mold cavity; and
   c) blow molding a load bearing component having a hollow interior cavity space to conformally bond in interlocking, complementary relation with said attachment portion, whereby said pallet stabilizing portion and load bearing portion are integrated to one another to form a pallet.

15. The method of claim 14 wherein said pallet stabilizing component comprises first and second runners, wherein said first and second runners each include a plurality of feet, and wherein said first and second runners further include a protruding attachment member.

16. The method of claim 15 wherein at least one protruding member comprises a flange.

17. The method of claim 14 wherein said attachment portion comprises a cavity.

18. A method of forming a plastic pallet comprising the steps of:
   a) forming first and second plastic runners, wherein each of said first and second runners has a support portion and an attachment portion;
   b) inserting the first and second runners into a mold and exposing each attachment portion in a mold cavity;
   c) blow molding a load bearing component having a hollow interior cavity to conformally engage and bond to each attachment portion to integrate said first and second runners to said load bearing component and form a pallet;
   d) ejecting the pallet from the mold; and
   e) allowing the pallet to cool.

19. The method of claim 18 further comprising, between steps b) and c), the step of holding at least one of said first and second runners in place by a clamp during the blow molding of the load bearing component.

20. The method of claim 18 further comprising the step of inserting a reinforcing member into said mold during the blow molding of the load bearing component, whereby the reinforcing member becomes encased in said pallet.

21. The method of claim 18 further comprising the step of inserting a reinforcing member into said load bearing component as said pallet cools, whereby surfaces of said load bearing component shrink around said reinforcing member.

22. The method of claim 18 wherein said first and second runners each include a plurality of feet and wherein said attachment portion comprises a plurality of attachment surfaces including protrusions and/or recesses at each of said plurality of feet and wherein said load bearing component is molded to interlock in complementary engagement with said attachment surfaces.

23. The method of claim 18 wherein a plurality of feet extend from said first and second runners, wherein each of said plurality of feet includes a protruding member, and wherein each protruding member is conformally interlocked into the load bearing component.

24. The method of claim 23 wherein at least one protruding member comprises a flange.

25. The method of claim 24 wherein at least one flange includes a rib.

26. The method of claim 24 wherein at least one flange includes a groove.

27. A pallet comprising:
   a pallet stabilizing component including a plurality of runners and wherein a plurality of feet project from said plurality of runners and further including a plurality attachment members; and
   a load bearing component having a hollow interior cavity space defined between upper and lower surfaces and wherein an attachment portion of said load bearing component is blow molded to bond to and define a shape that conformally interlocks in complementary relation with each attachment member and whereby said plurality of runners and feet are integrated into said load bearing component.

28. The pallet of claim 27 further comprising four recesses for four-way access.

29. A pallet comprising:
   a pallet stabilizing component comprising a plurality of feet and wherein said plurality of feet each include a protruding member; and
   a load bearing component having a hollow interior cavity space defined between upper and lower surfaces and wherein a plurality of attachment surfaces of said load bearing component are blow molded to define a complementary shape that conformally interlocks with and bonds to each protruding member and whereby said plurality of feet are integrated into said load bearing component to form a pallet.

30. The pallet of claim 29 wherein said protruding member comprises a flange.

31. The pallet of claim 30 wherein at least one flange includes a groove and wherein said top load bearing component includes a lip that interlocks with said groove.

32. The pallet of claim 29 wherein said plurality of feet extend from a plurality of runners.

33. The pallet of claim 29 wherein said plurality of feet extend from a plurality of runners, wherein said protruding member comprises a flange, and wherein said load bearing component conformally encases a substantial portion of each flange.

34. A method of blow molding a pallet comprising the steps of
   a) forming a pallet stabilizing component having a support portion and an attachment portion;
   b) inserting the pallet stabilizing component into a mold and exposing said attachment portion in a mold cavity; and
   c) blow molding a load bearing component having a hollow interior cavity space and wherein a portion said load bearing component forms a complementary shape that interlocks with said attachment portion, whereby said pallet stabilizing component and said load bearing component are integrated to one another to form a pallet.

35. The method of claim 34 wherein said attachment portion comprises a protruding member.

36. The method of claim 35 wherein said protruding member includes a groove.

37. The method of claim 34 wherein said attachment portion comprises a flange.

38. A method of blow molding a pallet comprising the steps of
   a) forming a pallet stabilizing component having a support portion and an attachment portion including a recess;
   b) inserting the pallet stabilizing component into a mold and exposing said attachment portion in a mold cavity; and
   c) blow molding a load bearing component having a hollow interior cavity space to conformally bond and interlock in complementary relation with said recess portion, whereby said pallet stabilizing component and load bearing component are integrated to one another to form a pallet.

* * * * *